US012495231B2

(12) United States Patent
Grinnip, III

(10) Patent No.: US 12,495,231 B2
(45) **Date of Patent: *Dec. 9, 2025**

(54) MICROPHONE WITH FIRST AND SECOND TRANSDUCER ASSEMBLIES

(71) Applicant: Shure Acquisition Holdings, Inc., Niles, IL (US)

(72) Inventor: Roger Stephen Grinnip, III, Lake Zurich, IL (US)

(73) Assignee: Shure Acquisition Holdings, Inc., Niles, IL (US)

(*) Notice: Subject to any disclaimer, the term of this patent is extended or adjusted under 35 U.S.C. 154(b) by 388 days.

This patent is subject to a terminal disclaimer.

(21) Appl. No.: 17/819,682

(22) Filed: Aug. 15, 2022

(65) Prior Publication Data

US 2022/0394364 A1 Dec. 8, 2022

Related U.S. Application Data

(60) Continuation of application No. 16/746,044, filed on Jan. 17, 2020, now Pat. No. 11,451,891, which is a (Continued)

(51) Int. Cl.
*H04R 1/02* (2006.01)
*B65D 81/18* (2006.01)
(Continued)

(52) U.S. Cl.
CPC ............... *H04R 1/02* (2013.01); *B65D 81/18* (2013.01); *H04R 1/028* (2013.01); *H04R 1/2807* (2013.01);
(Continued)

(58) Field of Classification Search
CPC .......... H04R 1/02; H04R 1/028; H04R 1/083; H04R 1/2807; H04R 1/2869; H04R 1/38;
(Continued)

(56) References Cited

U.S. PATENT DOCUMENTS 3,132,713 A 5/1964 Seeler
3,246,721 A 4/1966 Martin
(Continued)

FOREIGN PATENT DOCUMENTS

CN 203289638 11/2013
FR 1514451 2/1968
(Continued)

OTHER PUBLICATIONS

International Search Report and Written Opinion for PCT/US2018/042727 dated Sep. 26, 2018.

*Primary Examiner* — Huyen D Le
(74) *Attorney, Agent, or Firm* — Banner & Witcoff, Ltd.

(57) ABSTRACT

A microphone transducer is provided, the microphone transducer comprising a housing and a transducer assembly supported within the housing and defining an internal acoustic space. The transducer assembly includes a magnet assembly, a diaphragm disposed adjacent the magnet assembly and having a front surface and a rear surface, and a coil attached to the rear surface of the diaphragm and capable of moving relative to the magnet assembly in response to acoustic waves impinging on the front surface. The transducer assembly further includes a primary port establishing acoustic communication between the internal acoustic space and an external cavity at least partially within the housing, and a secondary port located at the front surface of the diaphragm.

15 Claims, 6 Drawing Sheets

Related U.S. Application Data division of application No. 15/653,217, filed on Jul. 18, 2017, now Pat. No. 10,542,337.

(51) Int. Cl.

| | |
|---|---|
| ***H04R 1/28*** | (2006.01) |
| ***H04R 1/38*** | (2006.01) |
| ***H04R 9/08*** | (2006.01) |
| *H04R 1/08* | (2006.01) |
| *H04R 3/00* | (2006.01) |
| *H04R 7/12* | (2006.01) |

(52) U.S. Cl.

CPC ................. *H04R 1/38* (2013.01); *H04R 9/08* (2013.01); *H04R 1/083* (2013.01); *H04R 1/2869* (2013.01); *H04R 3/007* (2013.01); *H04R 7/127* (2013.01); *H04R 2201/029* (2013.01); *H04R 2410/01* (2013.01)

(58) Field of Classification Search

CPC .......... H04R 3/007; H04R 7/127; H04R 9/08; H04R 9/14; H04R 2201/029; H04R 2410/01

See application file for complete search history.

(56) References Cited

U.S. PATENT DOCUMENTS

| | | | | |
|---|---|---|---|---|
| 3,940,575 | A * | 2/1976 | Bauer | H04R 1/38 381/357 |
| 3,989,905 | A | 11/1976 | Anderson | |
| 4,239,945 | A | 12/1980 | Atoji | |
| 4,742,887 | A | 5/1988 | Yamagishi | |
| 5,143,169 | A | 9/1992 | Ziegenberg | |
| 5,327,507 | A | 7/1994 | Suzuki | |
| 6,091,828 | A | 7/2000 | Akino | |
| 7,916,878 | B2 | 3/2011 | Bank | |
| 8,031,898 | B2 * | 10/2011 | Akino | H04R 9/08 381/177 |
| 8,447,056 | B2 | 5/2013 | Akino | |
| 8,705,786 | B2 | 4/2014 | Akino | |
| 8,761,427 | B2 | 6/2014 | Akino | |
| 8,818,009 | B2 | 8/2014 | Gilbert | |
| 9,094,748 | B2 | 7/2015 | Akino | |
| 9,510,074 | B2 | 11/2016 | Lee | |
| 10,334,367 | B2 | 6/2019 | Tanaka | |
| 10,542,337 | B2 | 1/2020 | Grinnip, III | |
| 11,451,891 | B2 * | 9/2022 | Grinnip, III | H04R 1/028 |
| 2013/0058515 | A1 | 3/2013 | Akino | |
| 2015/0003640 | A1 | 1/2015 | Akino | |
| 2016/0037263 | A1 | 2/2016 | Pal | |
| 2016/0112793 | A1 | 4/2016 | Akino | |

FOREIGN PATENT DOCUMENTS

| | | |
|---|---|---|
| GB | 1046177 | 10/1966 |
| JP | 61050398 | 4/1986 |
| JP | 3158850 | 10/1995 |
| JP | 5651070 | 12/2012 |
| JP | 5618420 | 1/2013 |
| KR | 20050030183 | 3/2005 |
| KR | 20150007467 | 1/2015 |
| WO | 2016170595 | 10/2016 |

* cited by examiner

MICROPHONE WITH FIRST AND SECOND TRANSDUCER ASSEMBLIES

CROSS-REFERENCE

This application is a continuation of U.S. patent application Ser. No. 16/746,044, filed on Jan. 17, 2020, which is a divisional of U.S. patent application Ser. No. 15/653,217, filed on Jul. 18, 2017 and issued as U.S. Pat. No. 10,542,337 on Jan. 21, 2020, each of which is incorporated herein by reference in their entirety.

TECHNICAL FIELD

This application generally relates to a dynamic microphone. In particular, this application relates to minimizing an internal acoustic volume of a moving coil microphone transducer.

BACKGROUND

There are several types of microphones and related transducers, such as for example, dynamic, crystal, condenser/capacitor (externally biased and electret), etc., which can be designed with various polar response patterns (cardioid, supercardioid, omnidirectional, etc.). Each type of microphone has its advantages and disadvantages depending on the application.

One advantage of dynamic microphones (including moving coil microphones) is that they are passive devices and therefore, do not require active circuitry, external power, or batteries to operate. Also, dynamic microphones are generally robust or sturdy, relatively inexpensive, and less prone to moisture/humidity issues, and they exhibit a potentially high gain before causing audio feedback problems. These attributes make dynamic microphones ideal for on-stage use and better suited to handle high sound pressure, such as, for example, from close-up vocals, certain musical instruments (e.g., kick drums and other percussion instruments), and amplifiers (e.g., guitar amplifiers).

However, dynamic microphone capsules are typically larger than, for example, condenser microphones. This is because dynamic microphones typically employ a large acoustical compliance, or a large internal cavity $C_1$ behind the diaphragm. The larger cavity tends to increase an overall axial length of the dynamic transducer, which increases the overall capsule size and limits the available form factors and practical applications of the microphone.

Accordingly, there is a need for a dynamic type microphone transducer that, among other things, provides improved form factors without sacrificing professional level dynamic microphone performance.

SUMMARY

The invention is intended to solve the above-noted and other problems by providing, among other things, a moving coil microphone transducer having an active diaphragm port and a secondary port configured to be positioned in parallel with, and introduce zero acoustic delay relative to, the active diaphragm port. This arrangement effectively uses an external acoustic volume to satisfy internal acoustic compliance requirements, thereby allowing minimization of an internal cavity volume of the transducer.

For example, one embodiment includes a microphone transducer comprising a housing and a transducer assembly supported within the housing and defining an internal acoustic space. The transducer assembly includes a magnet assembly, a diaphragm disposed adjacent the magnet assembly and having a front surface and a rear surface, and a coil attached to the rear surface of the diaphragm and capable of moving relative to the magnet assembly in response to acoustic waves impinging on the front surface. The transducer assembly further includes a primary port establishing acoustic communication between the internal acoustic space and an external cavity at least partially within the housing, and a secondary port located at the front surface of the diaphragm.

Another example embodiment includes a moving coil transducer assembly for a microphone. The transducer assembly includes a magnet assembly and a diaphragm disposed adjacent the magnet assembly, the diaphragm having a front surface and a rear surface. The transducer assembly further includes a coil attached to the rear surface and capable of interacting with a magnetic field of the magnet assembly in response to acoustic waves impinging on the front surface. The transducer assembly also includes a first acoustic path adjacent the rear surface of the diaphragm and a second acoustic path through the front surface of the diaphragm.

Another example embodiment includes a microphone comprising a microphone body and a transducer assembly disposed in the microphone body and defining an internal acoustic volume. The transducer assembly includes a diaphragm having at least one aperture disposed through a front surface of the diaphragm. The microphone further includes an external acoustic volume located outside the transducer assembly, the external acoustic volume in acoustic communication with the internal acoustic volume.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
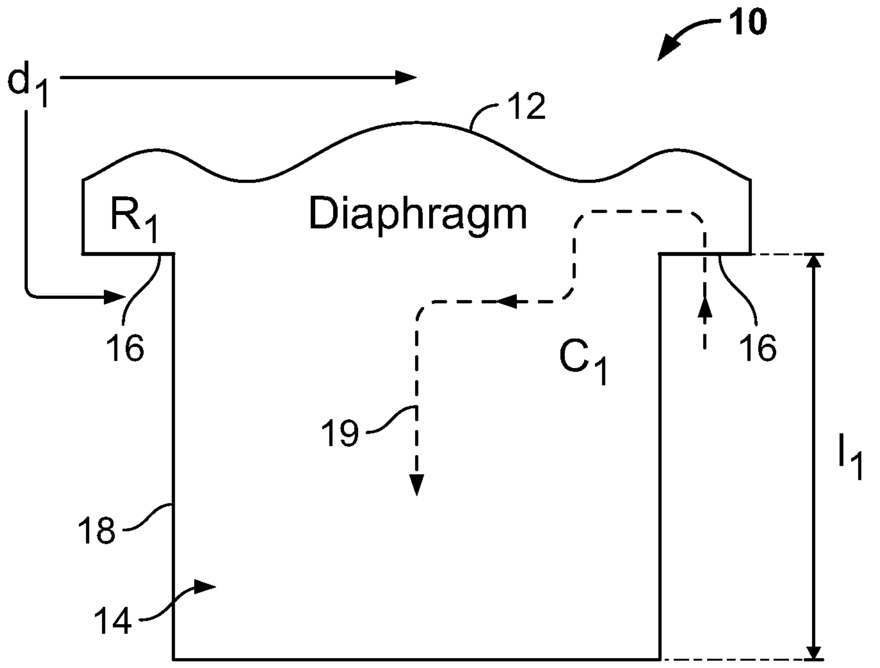
FIG. 1 (Prior Art)
FIG. 1 is a schematic diagram illustrating general topology of a conventional moving coil microphone transducer assembly.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Figure 2:
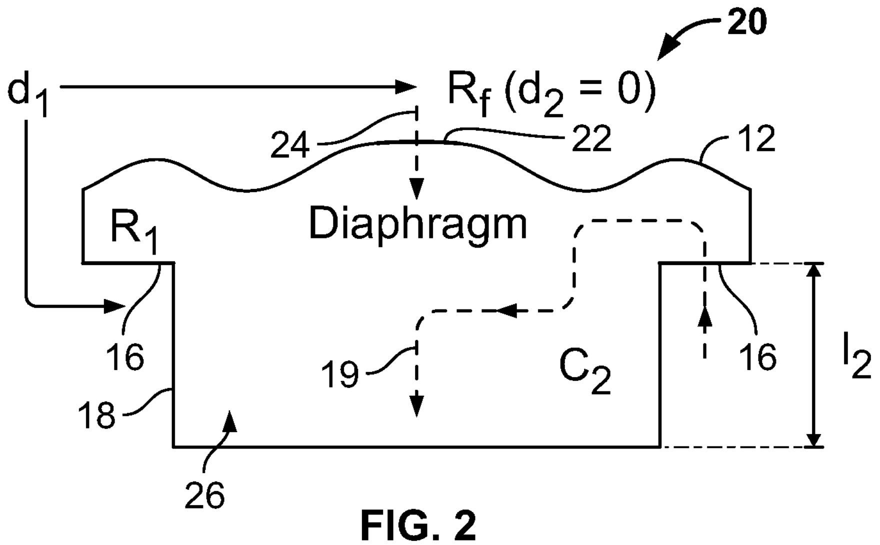
FIG. 2 is a schematic diagram illustrating general topology of an example moving coil microphone transducer assembly in accordance one or more embodiments.

FIG. 1 illustrates the topology of a typical or conventional moving coil microphone transducer 10, which is shown for comparison to the topology of moving coil microphone transducer 20 designed in accordance with the techniques described herein and shown in FIG. 2. As shown in FIG. 1, the conventional transducer 10 has an acoustical compliance $C_1$ that is defined behind diaphragm 12 in the form of a cavity 14 with a length $l_1$. An external acoustic delay $d_1$ of the transducer is defined by the distance between a front surface of the diaphragm 12 and a primary tuning port 16, represented by resistance $R_1$, positioned behind or at the rear of the diaphragm 12. The port 16 (also referred to as "active diaphragm port" or "rear port") establishes acoustic communication between the internal cavity volume $C_1$ and an external volume surrounding a housing 18 of the transducer 10. An acoustic flow (or path) representing the capture of sound waves from the rear of the transducer 10 is illustrated in FIG. 1 by a dotted line 19 entering the acoustic cavity 14 via the primary port 16.

The value for cavity compliance $C_1$, or the size of internal cavity 14, is dependent on primary port resistance $R_1$ (also referred to as "diaphragm tuning resistance" or "rear port resistance") and external acoustic delay $d_1$. Since the typical directional moving coil transducer has a relatively large diaphragm, the distance across the front surface of the diaphragm is also large, thus creating a large external acoustic delay $d_1$. The large external acoustic delay $d_1$ is countered by a corresponding internal acoustic delay, which is designed to create a phase shift for cancelling the sound waves approaching from the direction in which the external delay $d_1$ is defined. The internal acoustic delay is created by the diaphragm tuning resistance $R_1$ working in conjunction with the internal cavity volume of the transducer. In particular, the internal acoustic delay can be made large by setting the internal cavity volume, or cavity compliance $C_1$, to a high value and setting the tuning resistance $R_1$ to a low value. The diaphragm tuning resistance $R_1$ is set to a low value because of the following two characteristics of the transducer. First, given that the diaphragm tuning resistance $R_1$ is in series with the diaphragm volume velocity, the resistance $R_1$ is typically set to a value equal to the critical damping resistance $R_d$ of the diaphragm/coil system in order to critically dampen the diaphragm motion. Second, this critical damping resistance $R_d$ must be set to an exceedingly low value in order for the moving coil microphone transducer to reproduce the entire audio bandwidth (e.g., 20 hertz (Hz)≤f≤20 kilohertz (kHz)).

Thus, in a conventional moving coil microphone transducer, to improve the bandwidth of the transducer (e.g., shift the lower cutoff frequency down), the diaphragm tuning resistance $R_1$ must be decreased down to $R_d$ and the cavity compliance $C_1$ must be increased accordingly. As a result, the inner cavity volume of a typical directional, moving coil microphone transducer 10 is relatively large, which tends to increase the overall axial length h of the transducer 10, as shown in FIG. 1. This configuration limits the available form factors, and applications, for conventional moving coil microphone transducers.

In comparison, FIG. 2 shows a moving coil microphone transducer 20 (also referring to herein as "transducer assembly") that includes, in addition to the diaphragm 12 and the rear port 16 shown in FIG. 1, a secondary tuning port 22 located at the front surface of the diaphragm 12, in accordance with embodiments. The secondary port 22, represented by resistance $R_f$, is substantially parallel to a central axis of the transducer assembly 20 (or the diaphragm 12 included therein) and introduces or provides a second acoustic flow (or path) through the front of the diaphragm 12 and along the central axis, as shown by the second dotted line 24 in FIG. 2. In addition, the secondary port 22 is positioned substantially parallel to the primary port 16. Thus, the ports 22 and 16 form two parallel acoustic branches or paths (i.e. one path through each port) in the transducer 20, and the total series resistance, as seen by the diaphragm 12 of the transducer 20, is equal to $R_1||R_f$, or the parallel equivalent resistance through the two acoustic branches (i.e. $R_f*R_1/(R_f+R_1)$).

In embodiments, the total series resistance for transducer 20 is set equal to the critical damping resistance $R_d$ of the diaphragm/coil system (i.e. $R_d=R_1||R_f$) in order to critically dampen the diaphragm motion, like the transducer 10 in FIG. 1. However, given that directionality conditions are not affected by the value of resistance $R_f$, the diaphragm tuning resistance $R_1$ in transducer 20 can be decoupled from (e.g., need not equal) the critical damping resistance $R_d$, unlike the transducer 10. For example, as long as the equation $R_d=R_1||R_f$ is satisfied, the transducer 20 will still satisfy internal acoustical compliance requirements even if $R_1$ is increased beyond $R_d$. Thus, by selecting an appropriate value for the parallel port resistance $R_f$, the resistance $R_1$ can be increased to a value larger than the low-valued critical damping resistance $R_d$.

In embodiments, the diaphragm tuning resistance $R_1$ of transducer 20 is increased to a high value, which allows for a decrease in cavity compliance $C_2$, or a smaller sized internal cavity 26, due to the above-described inverse relationship between diaphragm tuning resistance and internal cavity volume. As shown in FIG. 2, the smaller internal acoustic volume $C_2$ can be achieved by selecting a smaller length $l_2$ for the cavity 26 formed behind the diaphragm 12 (e.g., as compared to length $l_1$ in FIG. 1). In this manner, the addition of port 22 can minimize the internal cavity 26, thus reducing the overall form factor of the microphone transducer 20. In addition, the presence of the secondary port 22 can help lower the cutoff frequency for the microphone transducer 20, since the diaphragm tuning resistance $R_1$ need not be lowered to the level of the critical damping resistance $R_d$.

In embodiments, in order to prevent the decreased compliance $C_2$ from affecting the bandwidth and directionality (e.g., polar pattern) of the transducer 20, the microphone transducer 20 is configured such that the external acoustic delay $d_1$ remains unchanged. This can be achieved by selecting a position for the secondary port 22 relative to the diaphragm 12 that does not introduce additional external delay of acoustic waves (i.e. in addition to $d_1$). For example, in FIG. 2, the secondary port 22, or the parallel acoustic branch formed thereby, is co-located with, or through, a center of the front surface of the diaphragm 12 (e.g., on the central axis of the diaphragm 12), so that a second external acoustic delay $d_2$, which is defined by the distance between the front surface of the diaphragm 12 and the secondary port 22, is zero (i.e. $d_2=0$). During operation, due to the location of the parallel acoustic paths, the transducer 20 can effectively use volume outside the housing 18 to satisfy internal acoustic compliance requirements, despite the smaller cavity 26. That is, the transducer 20 uses external acoustic volume, in conjunction with the internal acoustic volume 26, to perform microphone operations.

Thus, the techniques described herein provide a moving coil microphone transducer 20 in which the diaphragm tuning resistance $R_1$ and the internal cavity compliance $C_2$ can be adjusted without affecting fundamental microphone operation (i.e. bandwidth and directionality requirements). In some cases, the internal cavity 26 is minimized, so that the microphone capsule can have a lower profile, and overall mass, for high sound pressure level (SPL) applications (e.g., guitar amplifiers, percussion, etc.). In other cases, the internal cavity volume $C_2$ can be adjusted to obtain a desired polar pattern (e.g., unidirectional, omnidirectional, cardiod, etc.). In either case, adjustment of the cavity compliance $C_2$ parameter may be at least partially achieved by adjusting tuning inertance $L_1$ and/or external delay $d_1$ values for the microphone transducer 20.

In embodiments, adding the secondary port 22 to the microphone transducer 20 can significantly improve performance over the conventional transducer design by reducing the lower cutoff frequency (e.g., $f_L$=110 Hz) without increasing internal cavity volume $C_2$ to recover rejection. However, acoustical sensitivity of the microphone transducer 20 (e.g., f=1 kHz) can be affected by the presence of the secondary port 22 and/or the decreased internal cavity volume $C_2$. In particular, the microphone sensitivity may be reduced by an expected gain factor G, where $G=R_d/R_1$. In one example embodiment, the secondary port 22 causes a reduction in the mid-band frequency response, while retaining the low and high frequency response. Despite the lower mid-band sensitivity, the overall output of the microphone transducer 20 can be more balanced, and for certain applications, more than adequate. For example, the decreased sensitivity may not be a problem for high sound pressure level (SPL) applications (e.g., guitar amplifiers, percussion, etc.) or close proximity situations (e.g., vocals, etc.), or when amplification can be used. In some cases, the lower microphone sensitivity can be compensated for through external means, such as, for example, active amplification, optimized magnetic circuit, etc.

In embodiments, adding the secondary port 22 to the diaphragm 12 does not alter the low impedance characteristic of the transducer 20 at least because the branch resistance $R_f$ is placed in parallel with the diaphragm impedance $Z_m$. As a result, the total equivalent impedance, as seen by the diaphragm 12, is equal to $R_f \| Z_m$ (i.e. $R_f*Z_m/(R_f+Z_m)$), which remains a low value since the equation is dominated by the parallel branch resistance $R_f$. As mentioned above, the parallel branch resistance $R_f$ may be selected so that the diaphragm tuning resistance $R_1$ can be increased above the critical damping resistance $R_d$, while still keeping the total series resistance for transducer 20 equal to or lower than the critical damping resistance $R_d$ (i.e. $R_d=R_1 \| R_f$). In some embodiments, the parallel branch resistance $R_f$ is selected to be greater than the critical damping resistance $R_d$ (i.e. create an over-damp effect), such that the addition of the secondary port 22 to the diaphragm 12 effectively simplifies the acoustical design of a unidirectional moving coil microphone transducer to that of a unidirectional condenser transducer. In other embodiments, the parallel branch resistance $R_f$ is selected to be less than the critical damping resistance $R_d$, for example, in microphone applications where an under damping effect is desired (e.g., in the case of kick drum microphones). In still other embodiments, the parallel branch resistance $R_f$ is selected to be equal to the critical damping resistance $R_d$ in order to create an isolated transducer for active vibration cancellation (e.g., using accelerometers) that is inherently matched to a non-isolated, active transducer.

Figure 3:
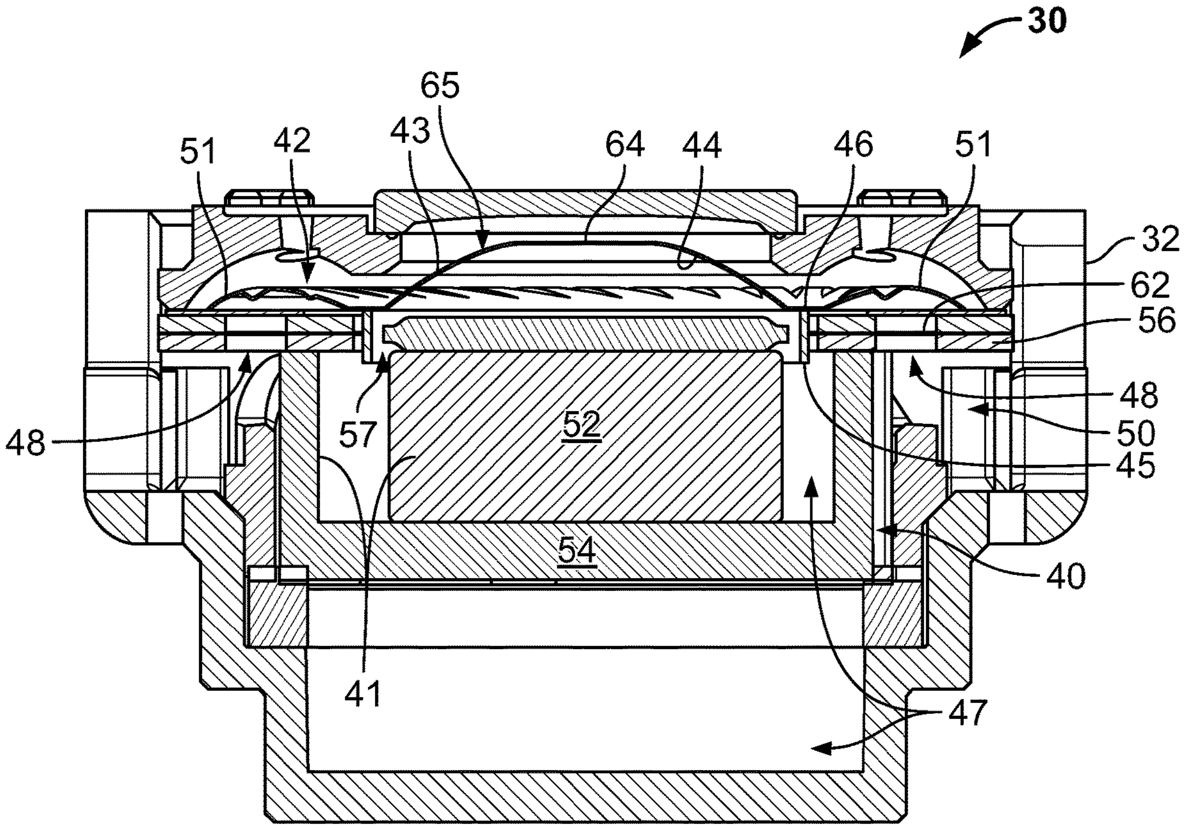
FIG. 3 is an elevational cross-section view of an example moving coil microphone transducer in accordance with one or more embodiments.
Figure 4:
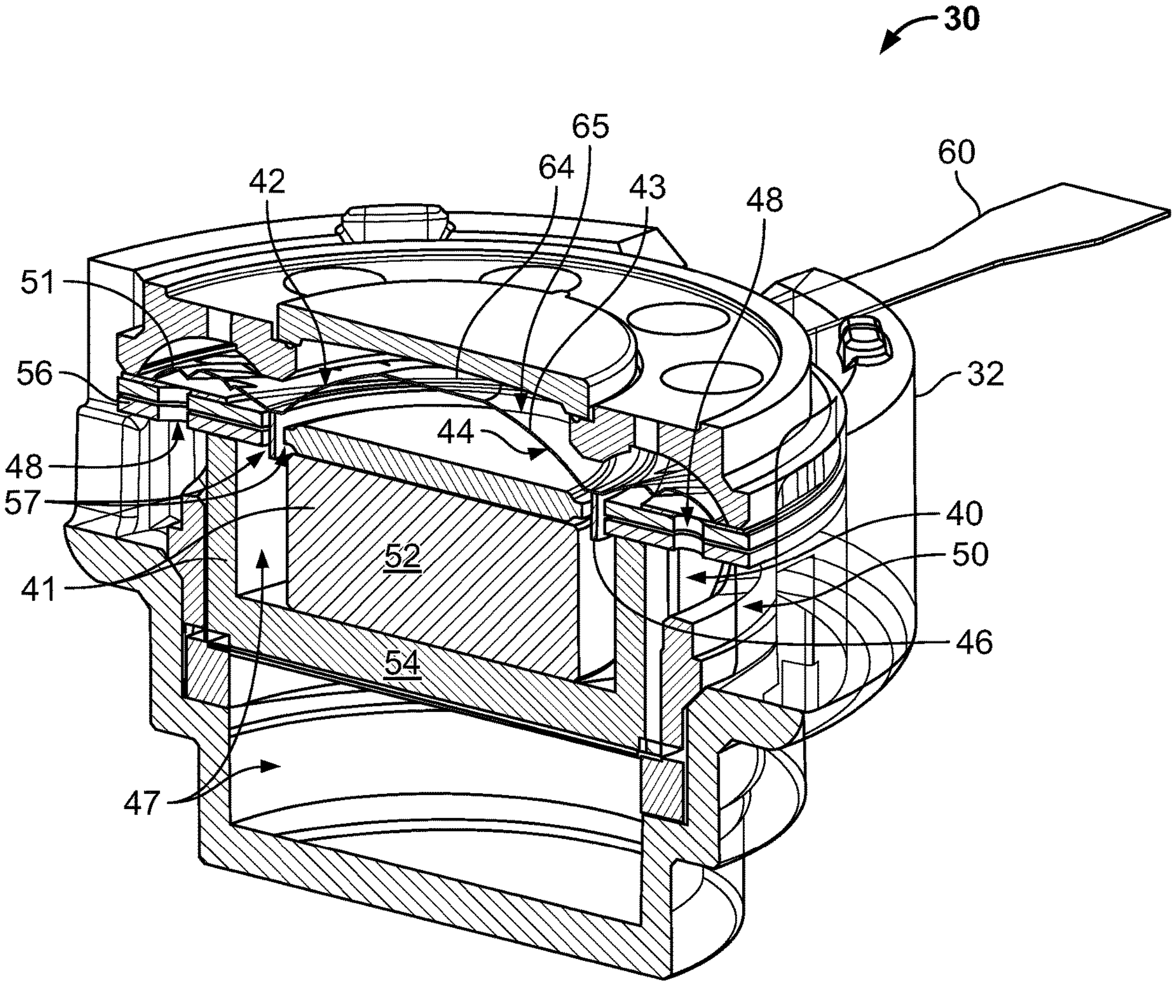
FIG. 4 is a perspective cross-section view of the moving coil microphone transducer depicted in FIG. 3.
Figure 5:
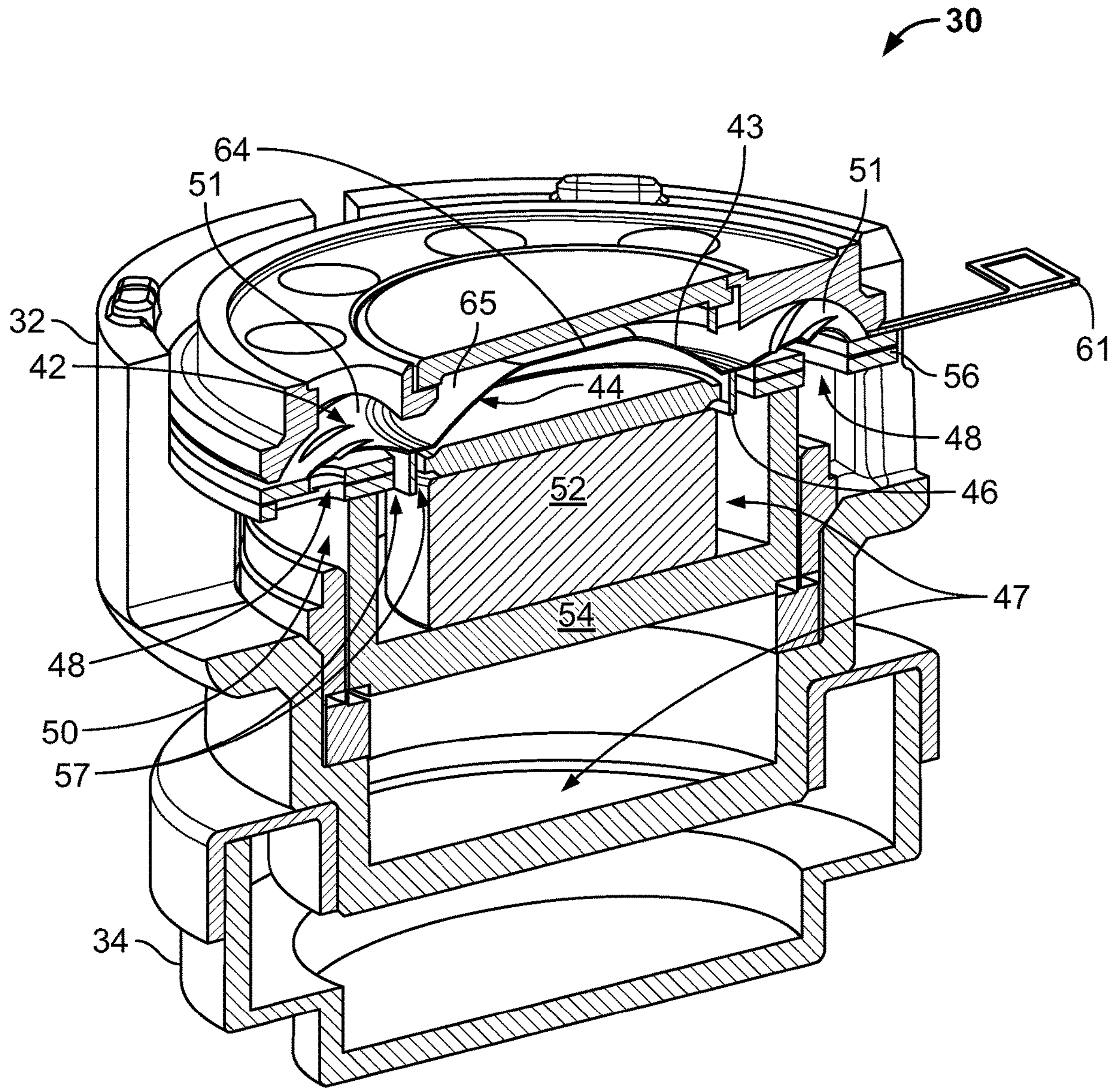
FIG. 5 is a perspective cross-section view of the moving coil microphone transducer depicted in FIGS. 3 and 4, disposed in a portion of a microphone body, in accordance with one or more embodiments.

Referring now to FIGS. 3-5, shown are cross-sectional views of an exemplary moving coil microphone transducer 30 in accordance with certain embodiments. As illustrated, the transducer 30 includes a housing 32 and a transducer assembly 40 supported within the housing 32 to accept acoustic waves. In FIGS. 3 and 4, portions of the microphone transducer 30, including the housing 32 and diaphragm 42, are shown as being transparent for illustrative purposes. In embodiments, the housing 32 may form all or part of a microphone capsule that encloses the microphone transducer 30 and connects to a larger microphone body 34, which is partially shown in FIG. 5. Also in embodiments, the transducer assembly 40 is at least topologically similar to the microphone transducer 20 shown in FIG. 2 and has the same or similar functionality and advantages as the microphone transducer 20 described above. In certain embodiments, the microphone transducer 30 is configured for unidirectional microphone operation. In other embodiments, the microphone transducer 30 can be configured for other modes of operation (cardioid, omnidirectional, etc.).

The transducer assembly 40 comprises a magnet assembly 41 and a diaphragm 42 disposed adjacent the magnet assembly 41. The diaphragm 42 has a front surface 43 disposed adjacent a front, inner surface of the housing 32 and an opposing rear surface 44 disposed adjacent the magnet assembly 41. The front surface 43 of the diaphragm 42 is configured to have acoustic waves impinge thereon. The rear surface 44 of the diaphragm 42 is connected or attached to a coil 45 at an attachment point 46. As shown, the coil 45 is suspended from the diaphragm attachment point 46 and extends into the magnet assembly 41 without touching the sides of the magnet assembly 41. The coil 45 is situated within the transducer assembly 40 in this manner so as to be capable of interacting with a magnetic field of the magnet assembly 41 in response to acoustic waves impinging on the front surface 43 of the diaphragm 42.

The transducer assembly 40 defines an internal acoustic space 47 and includes at least one air passage or port 48 for establishing or facilitating acoustic communication between the internal acoustic space 47 and an external cavity 50 located outside the transducer assembly 40. As shown, the external cavity 50 includes an acoustic space or volume defined between the housing 32 and the transducer assembly 40. The external cavity 50 can also include acoustic space located outside the housing 32, or the space surrounding the microphone transducer 30. As shown, the acoustic port(s) 48 are formed under an outer brim portion 51 of the diaphragm 42, or adjacent to the rear surface 44 of the diaphragm 42.

The outer edge of the diaphragm brim 51 is attached to a top of the magnet assembly 41 and/or the housing 32, while the inner edge of the diaphragm brim 51 is attached to the coil 45, thus creating a volume under the brim portion 51 of the diaphragm 42. In embodiments, the acoustic ports 48 (also referred to herein as "primary tuning ports") can form all or part of a phase delay network for tuning the directionality of the microphone transducer 30. In the embodiment shown, two ports 48 are implemented on either side of the transducer assembly 40. In other embodiments, the transducer assembly 40 may include a single port 48 on only one side of the transducer assembly 40.

The magnet assembly 41 includes a centrally disposed magnet 52 having its poles arranged vertically generally along a central vertical axis of the housing 32. The magnet assembly 41 also includes an annularly-shaped bottom magnet pole piece 54 that is positioned concentrically outwardly from the magnet 52 and has a magnetic pole that is the same as the magnetic pole of an upper portion of the magnet 52. The magnet assembly 41 further includes a top magnet pole piece 56 that is disposed above the central magnet 52, adjacent to upper arms of the bottom magnet pole piece 54. The top pole piece 56 has a magnetic pole that is opposite that of the upper portion of the central magnet 52. When acoustic waves impinge on the front diaphragm 42, the coil 45 moves with respect to the magnet assembly 41 and its associated magnetic field to generate electrical signals corresponding to the acoustic waves. The electrical signals can be transmitted via a coil connection and associated terminal lead, such as, for example, electric lead 60 shown in FIG. 4 or electric lead 61 shown in FIG. 5.

The internal acoustic space 47 (e.g., similar to the internal cavity 26 described above and shown in FIG. 2) is defined by a space behind the diaphragm 42 or adjacent the rear surface 44, a central space generally associated with the magnet assembly 41, and a rear or back space located below the magnet assembly 41, as shown in FIGS. 3-5. The internal acoustic space 47 also includes a gap 57 formed around the coil 45, or the space between the coil 45 and the magnet 52 and the space between the coil 45 and the top magnet pole piece 56. The primary tuning port(s) 48 (e.g., similar to the diaphragm tuning port(s) 16 described above and shown in FIG. 2) facilitate acoustic communication between the internal acoustic space 47 and the external cavity 50. In the illustrated embodiment, each primary port 48 is an aperture within the top pole piece 56 (also referred to herein as "top portion") of the magnet assembly 41, so as to create an acoustic flow or path adjacent to the rear surface 44 of the diaphragm 42. An acoustic resistance 62 (e.g., similar to the resistance $R_1$ described above and shown in FIG. 2) is disposed between the two pieces of the top pole piece 56, so that the acoustic resistance 62 is encountered by acoustic waves passing through the port(s) 48. The acoustic resistance 62 may be a fabric, screen, or other suitable material for creating acoustic flow resistance at the port(s) 48.

Figure 6:
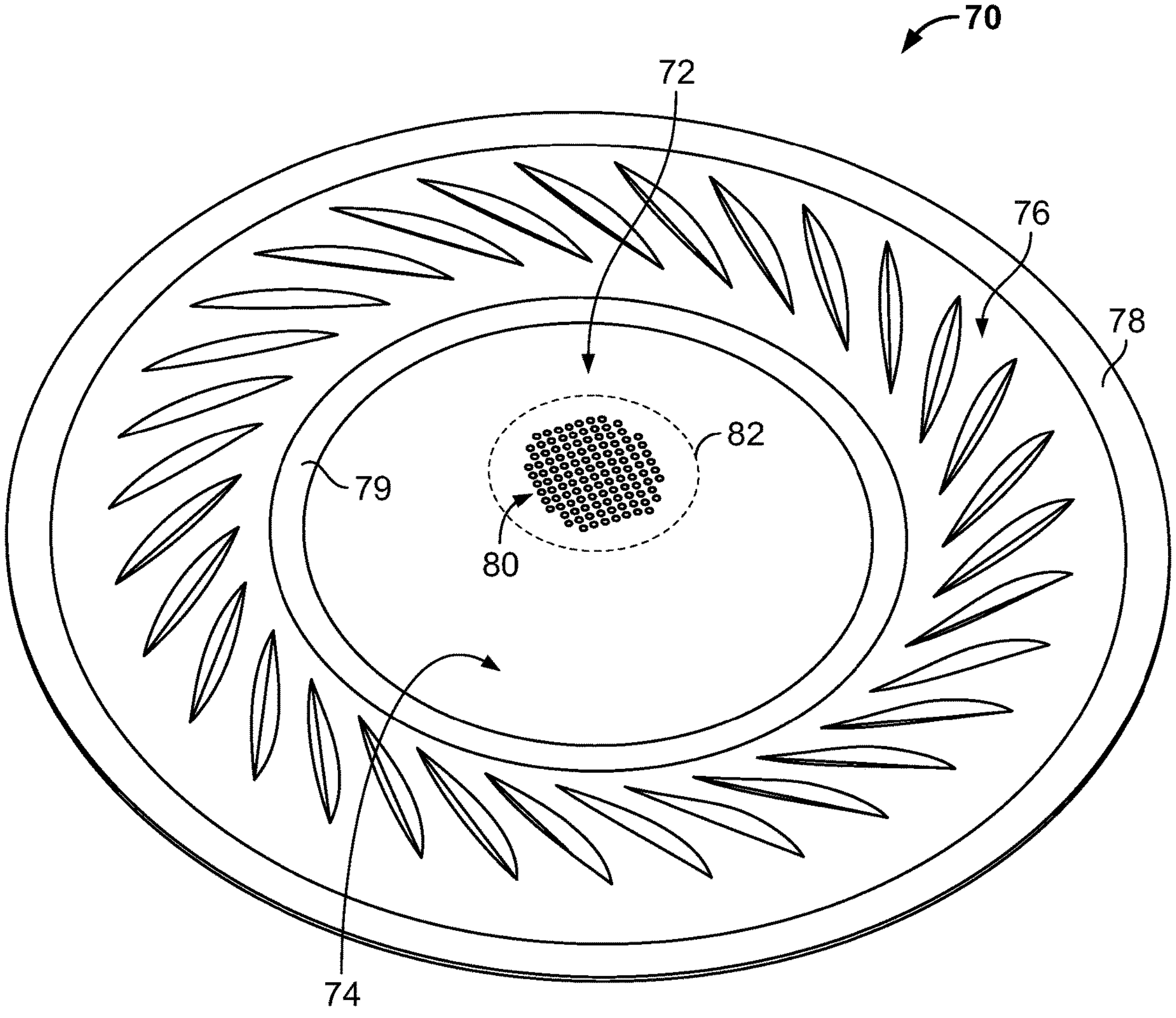
FIG. 6 is a perspective view of an example diaphragm in accordance with one or more embodiments.

In embodiments, the transducer assembly 40 further includes a secondary port 64 located at the front surface 43 of the diaphragm 42 for creating an acoustic flow or path through the front surface 43. As shown, the secondary port 64 (e.g., similar to the secondary port 22 described above and shown in FIG. 2) is positioned substantially parallel to the primary port(s) 48 located under or behind the outer brim 51 of the diaphragm 42. The secondary port 64 can be formed from, or include, one or more apertures disposed in or through the front surface 43 of the diaphragm 42, as shown in FIG. 6 and described in more detail below. In the illustrated embodiment, the secondary port 64 is a single port located at the center and/or top of a dome 65 formed by the diaphragm 42, such that an acoustic delay between the primary port(s) 48 and the secondary port 64 is zero (e.g., $d_2=0$). Placement of the secondary port 64 in the center of the diaphragm 42 may provide the best or a preferred frequency response performance for the microphone transducer 30. However, in other cases, the secondary port 64 may be placed elsewhere on the diaphragm 42 if other frequency responses are preferred or can be tolerated. For example, in such cases, the secondary port 64 may include a plurality of ports placed uniformly across the diaphragm 42, or in a concentric array spread across the diaphragm 42.

FIG. 6 shows an exemplary diaphragm 70 (e.g., similar to diaphragm 42 shown in FIGS. 3-5) comprising an exemplary secondary port 72 (e.g., similar to secondary port 64 shown in FIGS. 3-5), in accordance with embodiments. The secondary port 72 is configured to create a second acoustic flow resistance (e.g., similar to the parallel port resistance $R_f$ described above and shown in FIG. 2) through the diaphragm 70 and substantially parallel to an acoustic resistance formed below the diaphragm 70 (e.g., similar to acoustic resistance 62 shown in FIGS. 3-5).

In the illustrated embodiment, the secondary port 72 is located at the center of a dome portion 74 of the diaphragm 70 (e.g., similar to central dome 65 shown in FIGS. 3-5), so as to minimize or eliminate an external acoustic delay relative to the diaphragm 70. The dome portion 74 is surrounded by a resilient brim 76 (e.g., similar to outer brim portion 51 shown in FIGS. 3-5). In embodiments, the diaphragm 70 is a single-piece structure, such that the dome portion 74 and the resilient brim 76 are formed from a continuous piece of material. An outer edge 78 of the brim 76 may be attached to a top surface of the transducer assembly comprising the diaphragm 70, such as, for example, the transducer assembly 40 shown in FIGS. 3-5. The resilient brim 76 meets or attaches to the dome portion 74 at an inner edge 79. A rear surface (e.g., similar to attachment point 46 shown in FIGS. 3-5) of the inner edge 79 is attached to a coil (e.g., similar to coil 45 shown in FIGS. 3-5) of the transducer assembly. In embodiments, one or more acoustic paths are formed by tuning port(s) (e.g., similar to primary port(s) 48 shown in FIGS. 3-5) located underneath the resilient brim 76 between the outer edge 78 and inner edge 79. These acoustic path(s) are substantially parallel to the acoustic path formed through the diaphragm 42 by the secondary port 72.

As shown, the secondary port 72 can be formed from a plurality of apertures 80. In some embodiments, the apertures 80 are patterned directly into, or formed through, the diaphragm material itself using, for example, laser cut, die cut, or other manufacturing technique capable of piercing or creating holes in the diaphragm 70. In such cases, the patterned portion of the diaphragm 70 serves as the second acoustic resistance (e.g., $R_f$) for any acoustic waves passing through the secondary port 72. In other embodiments, the secondary port 72 is created by forming an aperture or hole 82 through the diaphragm 70 and covering the hole 82 with a separate piece of material that includes the plurality of apertures 80 or is otherwise configured to provide the second acoustic resistance (e.g., $R_f$). In such cases, the diaphragm hole 82 can be formed by cutting out or otherwise removing a portion of the diaphragm 70. The acoustic resistance material can be affixed to the diaphragm material surrounding the hole 82 using glue or other appropriate adhesive. As an example, the acoustic resistance material may be a screen or a piece of fabric that is pre-perforated with the plurality of apertures 80. In such embodiments, the acoustic resistance material (also referred to herein as a "perforated material") is a light-weight, low inertance material, so as to avoid mass loading the diaphragm 70 or otherwise altering operation of the microphone transducer due to the additional mass of the acoustic resistance material.

In some alternative embodiments, a second microphone transducer assembly may be added to the microphone transducer 30 to cancel vibrations or otherwise mitigate vibration sensitivity effects in the microphone transducer 30 due to the addition of the secondary port 64. For example, while the acoustical sensitivity of the microphone transducer 30 scales as a factor of the expected gain G, where $G=R_d/R_1$, the vibrational sensitivity of the microphone does not. This is because structural excitation of the transducer is "base excitation" caused by displacement of the microphone handle, direct contact with the microphone capsule, or other handling of the microphone base. The resulting vibrational response, or microphone handling noise, depends on the total system damping (i.e. the parallel combination of the exposed ports 48 and 64 of the microphone transducer 30), which may be unchanged by the addition of the secondary port 64. By contrast, acoustical excitation occurs through or via the exposed ports 48 and 64 of the microphone transducer 30 and thus, depends on damping through the individual acoustical network paths. As a result, the addition of secondary port 64 may lower the acoustical response of the microphone transducer 30, as compared to a conventional transducer without a secondary port (e.g., microphone transducer 10 of FIG. 1). However, when the acoustical response of the microphone transducer 30 is scaled to be equal to that of a conventional microphone transducer (e.g., by adjusting the microphone gain), the vibrational response of the microphone transducer 30 may appear to be higher than that of the conventional transducer. For example, in embodiments, the vibrational sensitivity of the microphone transducer 30 with secondary port 64 may be greater by a factor of $G^{-1}$ relative to a conventional microphone transducer with the same acoustical sensitivity. Further, moving coil microphone transducers, like the transducer 30, are already highly susceptible to structural excitation due to the presence of the coil 45. Thus, the microphone transducer 30 may require vibrational mitigation strategies to counteract the effects of adding the secondary port 64.

Figure 7:
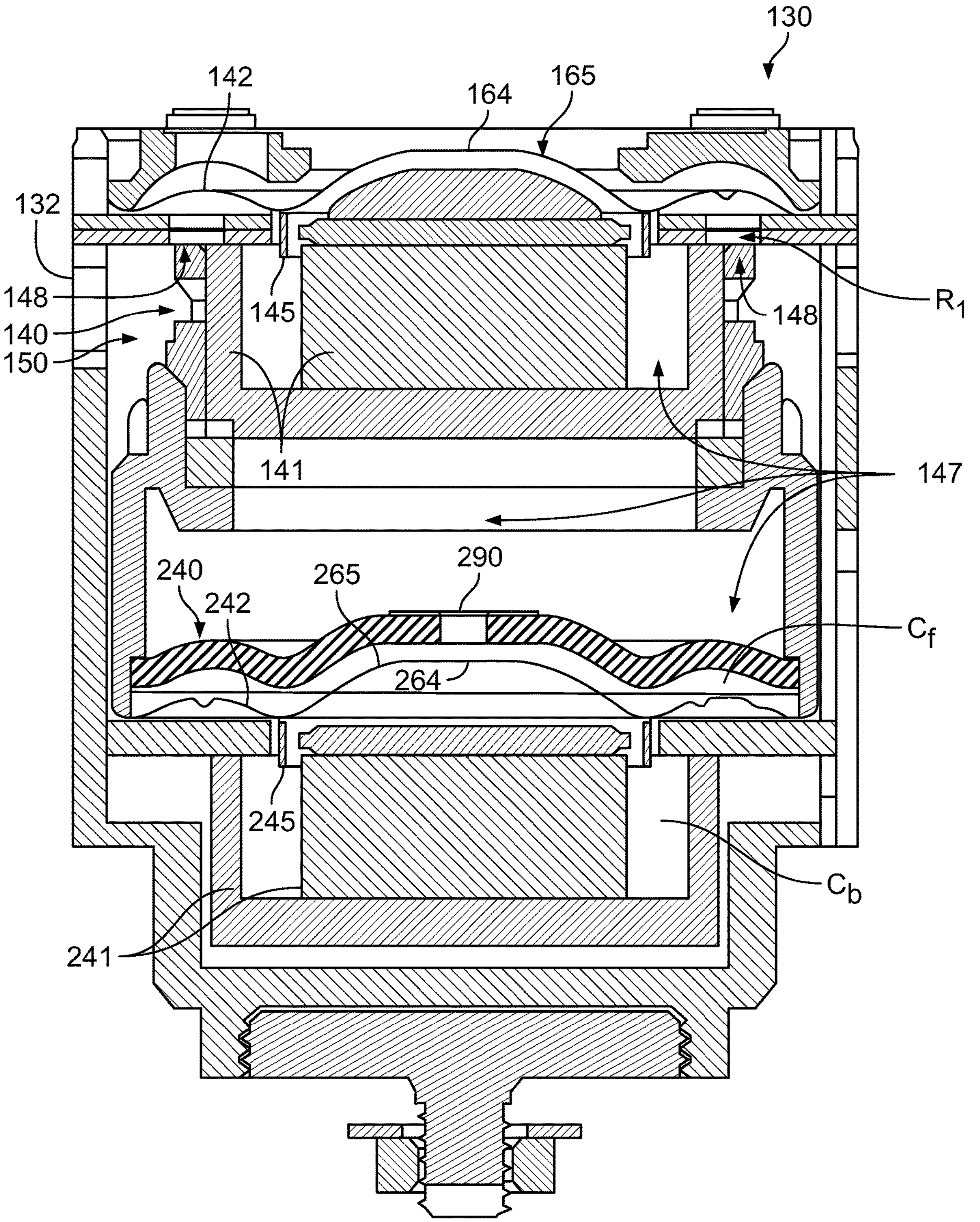
FIG. 7 is an elevational cross-section view of another example moving coil microphone transducer in accordance with one or more embodiments.

Referring now to FIG. 7, shown is one vibration mitigation strategy that uses a second transducer to cancel the vibration generated by the primary transducer. More specifically, FIG. 7 depicts an example microphone transducer 130 comprising a first microphone transducer assembly 140 (also referred to as a "primary transducer") and a second microphone transducer assembly 240 (also referred to as a "cancellation transducer"). The first microphone transducer assembly 140 can be substantially similar to the microphone transducer assembly 40 shown in FIGS. 3-5 and described above. For example, the first transducer 140 can include a magnet assembly 141, a diaphragm 142, and a coil 145 that are substantially similar to the magnet assembly 41, diaphragm 42, and coil 45 of the microphone transducer 30. The first transducer 140 can also include primary acoustic ports 148 similar to primary ports 48 of the microphone transducer 30, and a secondary acoustic port 164 through a central dome portion 165 of the diaphragm 142, similar to secondary port 64 of the microphone transducer 30.

To simplify frequency response matching and other microphone design considerations, the second transducer assembly 240 may be substantially identical to the first transducer assembly 140. For example, the second transducer assembly 240 may have the same structural frequency response as the first transducer 140 and may be oriented along the same excitation axis as, but have opposite polarity than, the first transducer 140. In some cases, the second transducer 240 may also have the same moving coil transducer construction as the first transducer 140. For example, the second transducer assembly 240 may include a magnet assembly 241, a diaphragm 242, and a coil 245 that is substantially similar to the magnet assembly 141, diaphragm 142, and coil 145 of the first microphone transducer assembly 140.

As shown, the two microphone transducers 140 and 240 can be incorporated into the same housing 132, so that the transducers 140 and 240 work together as a single microphone capsule with built-in vibration cancellation. To remove the vibration signal from the primary transducer 140, the output of the secondary transducer 240 must be electrically "subtracted" from the output of the primary transducer 140, with appropriate considerations being made for total microphone electrical output impedance. In embodiments, this can be achieved using one of two mechanical/acoustical implementations for constructing a microphone using two transducers.

A first exemplary implementation for placing two transducers within one microphone capsule involves completely isolating an internal acoustical domain $C_2$ of the first transducer 140 from an internal acoustical domain $C_3$ of the second transducer 240, such that the two transducers 140 and 240 are completely independent. This implementation may be optimal under certain orientation constraints, but does not allow minimization of the microphone capsule size. Thus, the first implementation may not be preferred when trying to achieve a smaller form factor.

FIG. 7 illustrates a second exemplary implementation, wherein the second microphone transducer assembly 240 is placed within an internal acoustical cavity 147 (or acoustical domain $C_2$) of the first microphone transducer assembly 140. As shown, the second transducer assembly 240 requires an acoustical domain or volume of at least $C_3=C_f+C_b$, where $C_f$ is the volume in front of the diaphragm 242 and $C_b$ is the volume behind the diaphragm 242. In the second implementation, the acoustical domain $C_3$ of the second transducer 240 is shared with the acoustical domain $C_2$ of the first transducer 140. The cavities $C_2$ and $C_3$ can be coupled through a port 290 having an acoustic resistance $R_3$, so that the second transducer 240 can operate within the primary tuning volume $C_2$ of the first transducer 140. In some embodiments, the cancellation transducer 240 can be encased completely within the primary transducer 140, such that no extra space is required to accommodate the second transducer assembly 240. In such cases, the housing 132 can be substantially similar in size and shape to the housing 32 of the microphone transducer 30.

In the illustrated configuration, the second transducer 240 is coupled to the structural disturbances and internal acoustical disturbances of the first transducer 140, but may be isolated from the external acoustic disturbances experienced by the first transducer 140. This is because the internal acoustical domain $C_2$ of the primary transducer 140 is partially isolated from the external acoustical disturbances due to an acoustic resistance $R_1$ through the primary ports 148 of the first transducer 140. At the same time, cavity impedance over the intended bandwidth is such that acoustic pressure changes uniformly within the cavity $C_2$. As a result, the cavity pressure fluctuation of $C_2$ does not excite the diaphragm 242 of the cancellation transducer 240 (or if it does, it can be accounted for in the resulting frequency response using known techniques). Further, cavity segmentation, ported through acoustical resistance, can be used if additional isolation is needed, but depending on the resistance through the zero delay port 164, the resistance $R_1$ through the primary ports 148 may be large enough for isolation.

In embodiments, for at least the same reasons as discussed above with respect to FIG. 2, the total series resistance for the first transducer 140 may be set equal to or lower than the critical damping resistance $R_d$ (i.e. $R_d=R_1||R_{f1}$), where $R_{f1}$ is the acoustic resistance through the secondary port 164 of the first transducer 140. In order to provide matching vibrational frequency responses, the second transducer 240 may be configured to have the same $R_d$ parameter as the primary transducer 140. This may be achieved, at least in part, by using the techniques described above to create a secondary port 264 through the diaphragm 242 of the second transducer 240, similar to the secondary port 164 of the first transducer 140. For example, the secondary port 264 may be formed by either creating a plurality of holes within the center of a central dome portion 265 of the diaphragm 242 or by placing a separate screen or cloth over a hole through the central dome portion 265 (see, e.g., FIG. 6). In addition, the second transducer 240 may be configured such that the secondary port 164 represents the sole acoustical path from the front of the diaphragm 242 to the back of the diaphragm 242, thus making the total series resistance for the second transducer 240 equal to the acoustic resistance $R_{f2}$ through the secondary port 264. As a result, the vibrational response of the second transducer 240 can be matched to that of the first transducer 140 by simply setting the resistance $R_{f2}$ equal to the critical damping resistance $R_d$ (i.e. $R_{f2}=R_d$).

In embodiments, the internal cavity 147 of the first transducer assembly 140 can remain minimized in size (e.g., like the cavity 47 of the transducer 30 shown in FIG. 3) by increasing the resistance $R_{f1}$ through the secondary port 164 of the first transducer 140 beyond the critical damping resistance $R_d$ (i.e. $R_{f1}>R_d$) and setting the resistance $R_{f2}$ through the secondary port 264 of the second transducer 240 equal to the critical damping resistance (i.e. $R_{f2}=R_d$), as discussed above. Thus, by using the existing internal cavity 147 of the first transducer 140 to operatively house the second transducer 240, the illustrated implementation can provide vibration cancellation without sacrificing the smaller microphone capsule size of the microphone transducer 130.

In some embodiments, the microphone transducer 130 can be configured to obtain first order directionality while also accounting for a pressure response from the secondary transducer 240 within the combined electrical signal output by the microphone transducer 130. Although the second transducer 240 is effectively bypassed by the resistance $R_{f2}$ through the secondary port 264, the second transducer 240 may output a low-level pressure response that, unless accounted for, can affect the frequency response of the first transducer 140, or at the very least, create a "noise floor" that acts as a minimum level of rejection for the polar pattern of the microphone. One technique for addressing this issue is to modify the polar response of the primary transducer 140 by intentionally "de-tuning" the polar response of the primary transducer 140 to match the pressure response of the secondary transducer 240, so that when the response signals are subtracted, the resulting output signal is the desired polar response. For example, to obtain a unidirectional microphone using dual transducers in a shared volume implementation, the individual response of the primary transducer 140 can be pushed towards omnidirectional, as compared to the desired polar response, and the secondary transducer 240 can have a pressure response that is proportional to the cavity pressure within the cavity in front of the diaphragm, or $C_f$, at low frequencies. At higher frequencies, the acoustical response may be unaffected by the second transducer 240 because the pressure response rolls off in amplitude.

Thus, the techniques described herein provide for minimizing the internal acoustic volume of a moving coil microphone transducer, as compared to conventional moving coil microphone transducers, without sacrificing low frequency bandwidth (e.g., f=100 Hz) or affecting directionality characteristics of the microphone.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A microphone, comprising:

a microphone body;

a first microphone transducer assembly disposed in the microphone body, the first microphone transducer assembly comprising a first diaphragm and a first internal cavity defining a first internal acoustic volume;

an external acoustic volume located outside the first microphone transducer assembly, the external acoustic volume in acoustic communication with the first internal acoustic volume; and a second microphone transducer assembly disposed within the first internal acoustic volume of the first microphone transducer assembly, the second microphone transducer assembly comprising:

a second diaphragm having one or more apertures passing through the second diaphragm, and a second internal cavity defining a second internal acoustic volume, the second internal cavity configured such that an external acoustic delay associated with the one or more apertures is substantially equal to zero.

2. The microphone of claim 1, wherein the first microphone transducer assembly further includes a tuning port for establishing the acoustic communication between the external acoustic volume and the first internal acoustic volume.

3. The microphone of claim 2, wherein an acoustic resistance associated with the tuning port is less than a critical damping resistance of the first diaphragm.

4. The microphone of claim 2, wherein a first acoustic path formed by the tuning port is disposed substantially parallel to a second acoustic path formed by the one or more apertures in the second diaphragm.

5. The microphone of claim 1, wherein the one or more apertures includes a plurality of apertures formed through a material of the second diaphragm and configured to create acoustic flow resistance through a center of the second diaphragm.

6. The microphone of claim 1, further comprising a perforated material configured to cover the one or more apertures and create acoustic flow resistance through a center of the second diaphragm.

7. A microphone, comprising:
a microphone body;
a first microphone transducer assembly disposed in the microphone body, the first microphone transducer assembly comprising a first diaphragm and an internal cavity defining an internal acoustic volume;
an external acoustic volume located outside the first microphone transducer assembly, the external acoustic volume in acoustic communication with the internal acoustic volume; and
a second microphone transducer assembly disposed within the internal acoustic volume of the first microphone transducer assembly, the second microphone transducer assembly comprising a second diaphragm having one or more apertures passing through the second diaphragm,
wherein the first microphone transducer assembly further comprises a tuning port for establishing the acoustic communication between the external acoustic volume and the internal acoustic volume, and an acoustic resistance associated with the tuning port is less than a critical damping resistance of the first diaphragm, and
wherein a first acoustic path formed by the tuning port is disposed substantially parallel to a second acoustic path formed by the one or more apertures in the second diaphragm.

8. The microphone of claim 7, wherein the one or more apertures includes a plurality of apertures formed through a material of the second diaphragm and configured to create acoustic flow resistance through a center of the second diaphragm.

9. The microphone of claim 7, further comprising a perforated material configured to cover the one or more apertures and create acoustic flow resistance through a center of the second diaphragm.

10. The microphone of claim 7, wherein the second microphone transducer assembly further comprises a second internal cavity defining a second internal acoustic volume, the second internal cavity configured such that an external acoustic delay associated with the one or more apertures is substantially equal to zero.

11. A microphone, comprising:
a microphone body;
a first microphone transducer assembly disposed in the microphone body, the first microphone transducer assembly comprising a first diaphragm and an internal cavity defining an internal acoustic volume;
an external acoustic volume located outside the first microphone transducer assembly, the external acoustic volume in acoustic communication with the internal acoustic volume;
a second microphone transducer assembly disposed within the internal acoustic volume of the first microphone transducer assembly, the second microphone transducer assembly comprising a second diaphragm having one or more apertures passing through the second diaphragm; and
a perforated material configured to cover the one or more apertures in the second microphone transducer assembly and create acoustic flow resistance through a center of the second diaphragm.

12. The microphone of claim 11, wherein the first transducer assembly further includes a tuning port for establishing the acoustic communication between the external acoustic volume and the internal acoustic volume.

13. The microphone of claim 12, wherein an acoustic resistance associated with the tuning port is less than a critical damping resistance of the first diaphragm.

14. The microphone of claim 12, wherein a first acoustic path formed by the tuning port is disposed substantially parallel to a second acoustic path formed by the one or more apertures in the second diaphragm.

15. The microphone of claim 11, wherein the second microphone transducer assembly further comprises a second internal cavity defining a second internal acoustic volume, the second internal cavity configured such that an external acoustic delay associated with the one or more apertures is substantially equal to zero.

* * * * *